April 12, 1938.  H. YASUOKA  2,114,120
MACHINE FOR AUTOMATICALLY MANUFACTURING CONCENTRIC
CONDUCTORS ADAPTED FOR ELECTRICAL COMMUNICATIONS
Filed Feb. 4, 1937  4 Sheets-Sheet 1

INVENTOR.
Hitoshi Yasuoka.

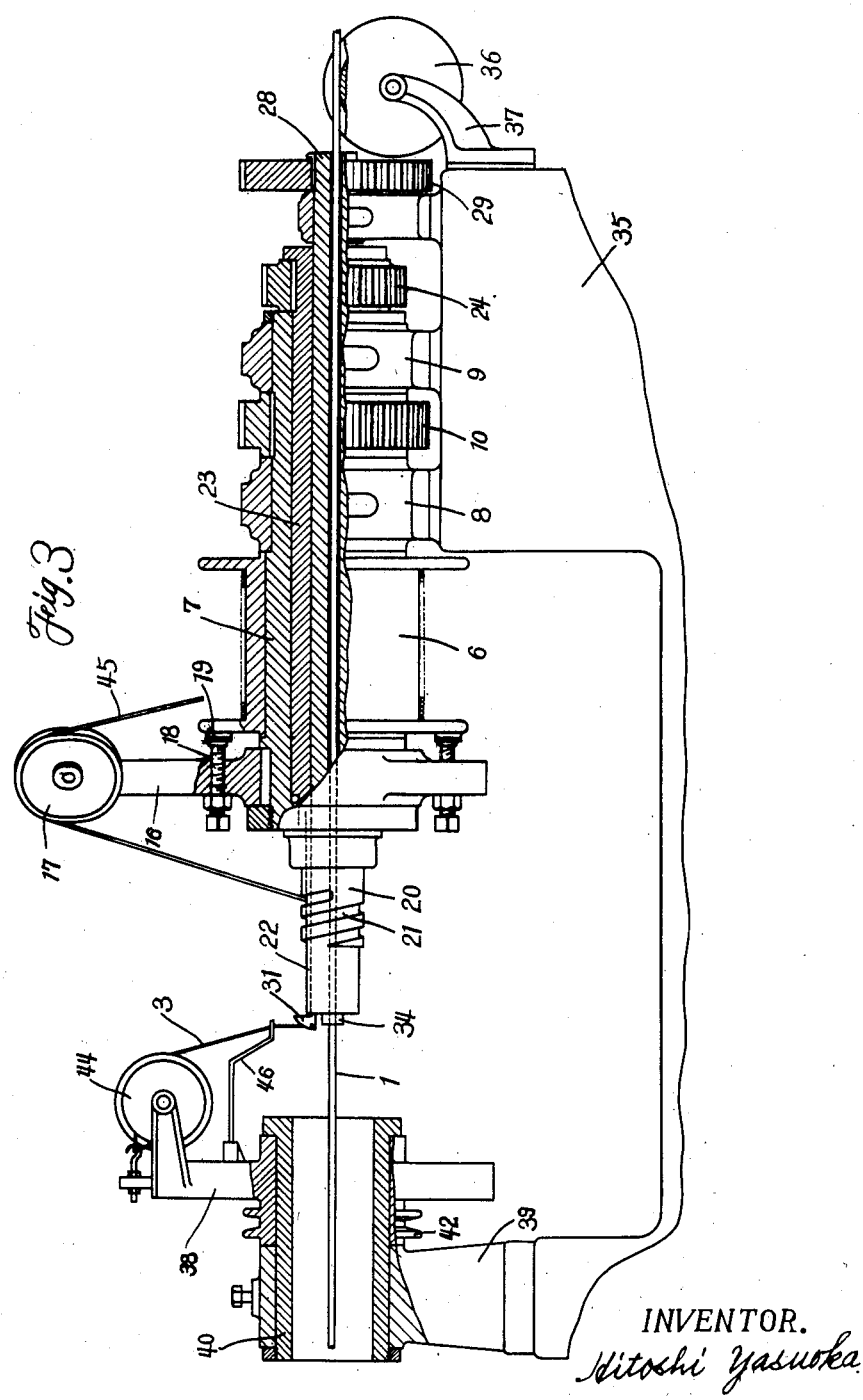

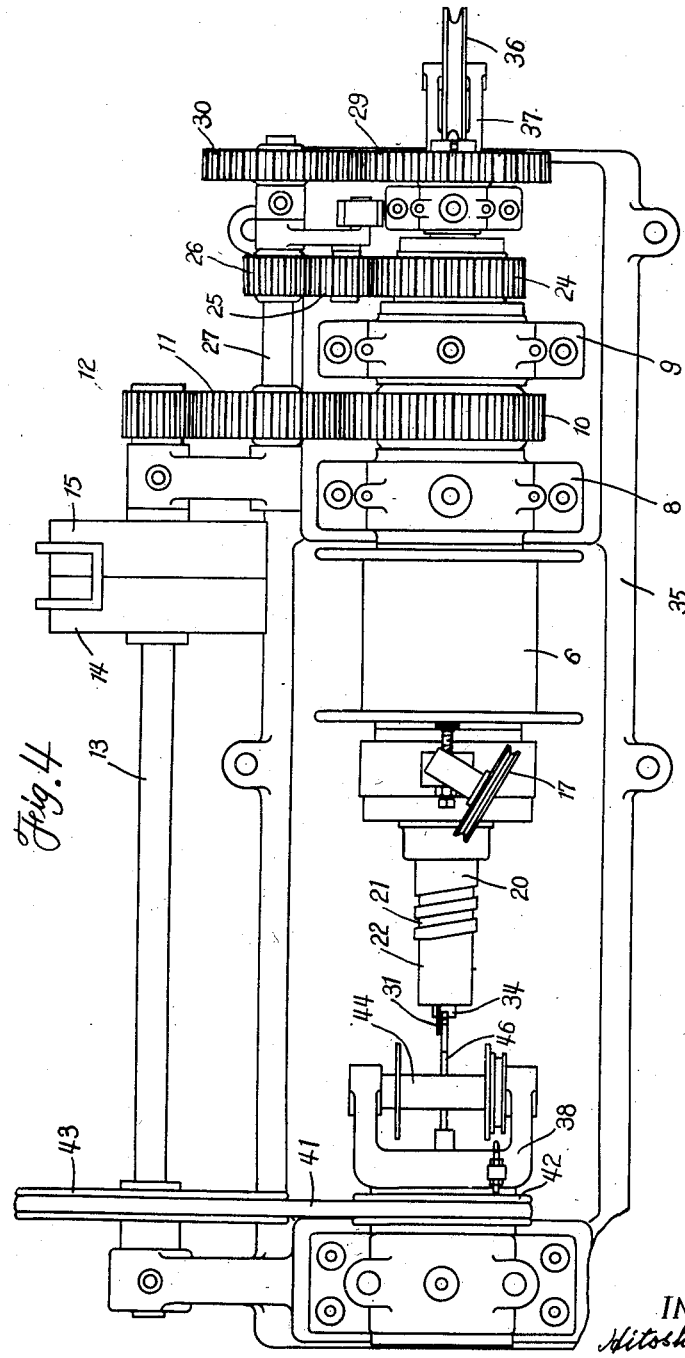

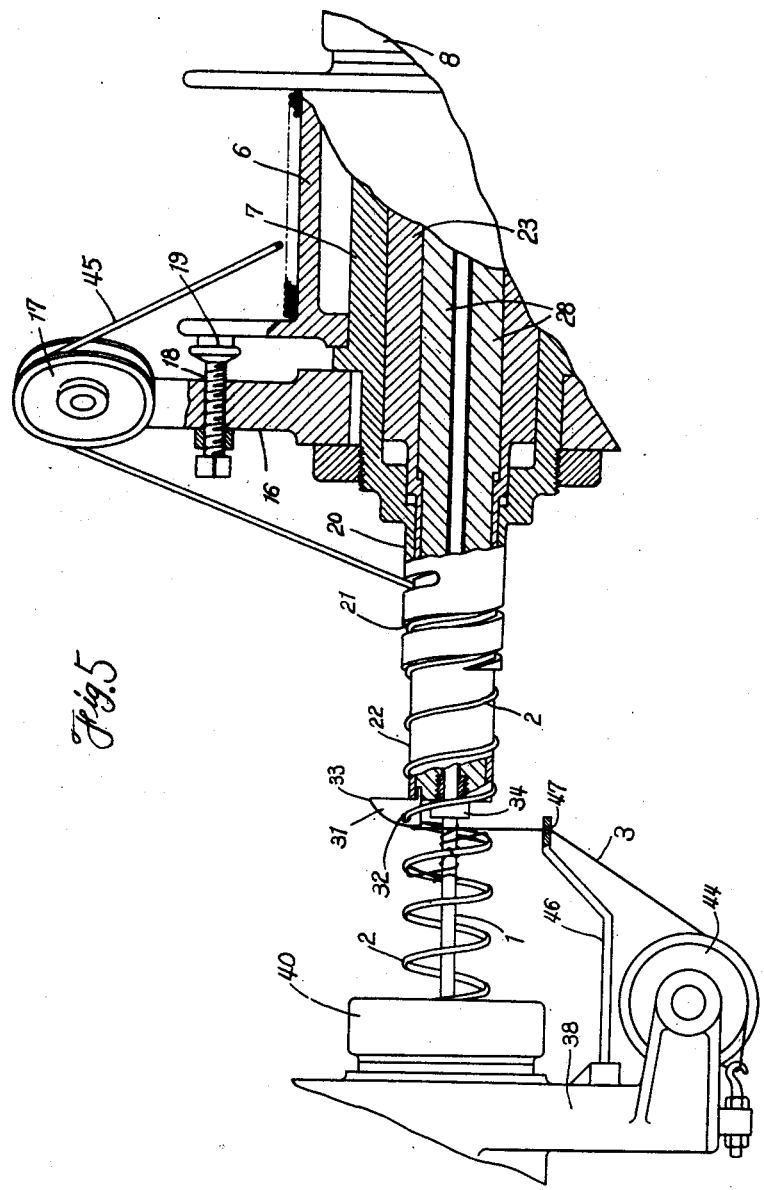

Patented Apr. 12, 1938

2,114,120

UNITED STATES PATENT OFFICE 2,114,120

MACHINE FOR AUTOMATICALLY MANUFACTURING CONCENTRIC CONDUCTORS ADAPTED FOR ELECTRICAL COMMUNICATIONS

Hitoshi Yasuoka, Tokyo, Japan, assignor to The Fujikura Electric Cable Works, Ltd., Tokyo, Japan Application February 4, 1937, Serial No. 124,102
In Japan October 29, 1936

3 Claims. (Cl. 173—244)

My invention relates to improvements in a machine for automatically manufacturing concentric conductors adapted for electrical communications and more particularly to an automatic machine for spirally winding a supporting wire and at the same time tieing a continuous insulator string between a central conductor and the spiral supporting wire, thereby firmly supporting the central conductor on the central axis of the spiral supporting wire, and has for its object to manufacture quickly and easily air insulated concentric conductors having a very small static capacity and greater flexibility.

In heretofore known air-insulated concentric conductors, solid distance pieces of insulating material had been disposed between the central and external conductors at predetermined distances for holding the central conductor exactly through the centre of surrounding tubular conductor. Since such distance pieces should have sufficient strength and are massive the static capacity of the concentric conductor is increased considerably. Accordingly if such solid and massive distance pieces can be dispensed with the static capacity of the air insulated concentric conductor will be greatly reduced. The inventor has devised to automatically connect a central conductor located through the center of a spiral supporting member by means of a continuous insulator string so as to hold the central conductor by the tension of radially extended tie strings without other solid distance pieces, thereby providing a concentric conductor having a very small static capacity and greater flexibility.

Figure 1:
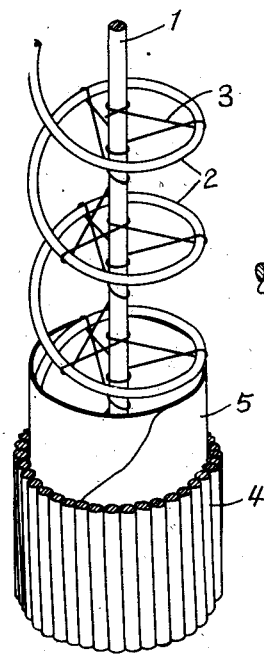
Figure 6:
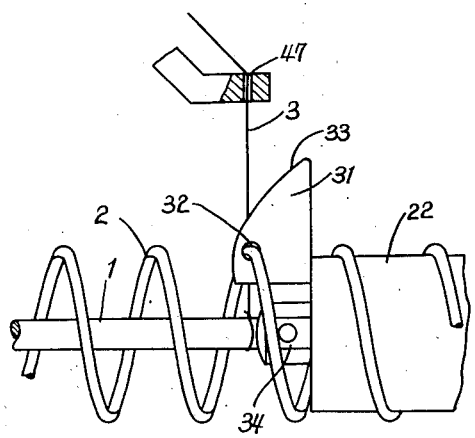
Figure 2:
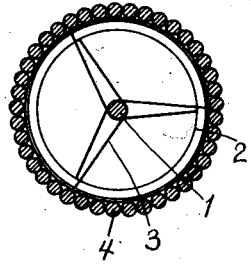
Figure 7:
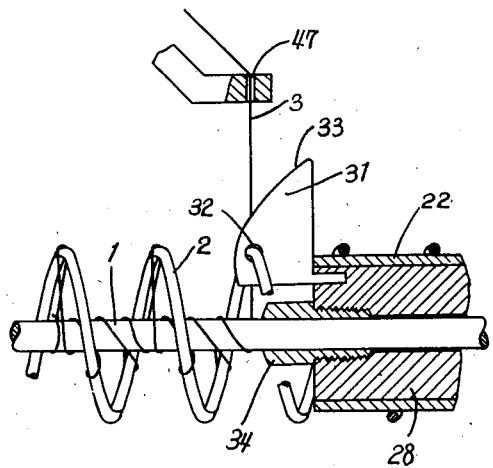

My invention will be better understood from the following description taken in connection with the accompanying drawings, wherein Fig. 1 is a perspective view of an example of a novel concentric conductor having a central conductor held through the central axis of a spiral supporting member by means of a continuous tension string of insulating material; Fig. 2 is its plan view; Fig. 3 is a view in elevation partly in section of the automatic machine embodying this invention; Fig. 4 is its plan view; Figs. 5, 6 and 7 are side elevations of the essential part of this machine in an enlarged scale for explaining the manner of applying tie string. Similar reference numerals identify similar parts throughout the different views of the drawings.

Prior to entering into the explanation of the present machine an example of the air insulated concentric conductor to be manufactured by the present machine will be shortly explained.

Referring to Figs. 1 and 2, 1 represents a central conductor and 2 is a spiral supporting member which may be of a bare or insulated metal wire or bar, or of an insulating material such as a cellulose bar and the like. 3 represents an insulating string which may be of a thread or a bundle of insulating fibrous materials such as cotton, hemp, paper, silk, rubber or cellulose. 4 represents external conductors wound around the spiral supporting member 2 over the insulating layer 5. The string 3 tied to the central conductor 1 is led out radially and turned around the spiral member 2 and then wound around the central conductor 1 while both members are being forwarded. Accordingly the string 3 is led out to the different radial directions to repeat the same operations so that two sets of three almost equi-angular radial tension strings for each one pitch length of the spiral member 2 as shown in Fig. 2 can be obtained. Thus the central conductor can be firmly held by the tension of tie strings at center of the spiral member 2.

The present machine is devised to automatically coil the spiral supporting member 2 surrounding the central conductor 1 and at the same time to wind the tie string 3 around the central conductor and the spiral member alternately while both members are continuously forwarded. Now referring to Figs. 3, 4 and 5, 35 represents the machine frame; 6 is a winding drum which is loosely mounted on the hollow shaft 7 supported by bearings 8 and 9 and the hollow shaft 7 is driven by the gearings 10, 11 and 12 from a driving shaft 13, on which pulleys 14 and 15 are mounted, the former being an idle pulley. At the end of the hollow shaft 7 is fixed an arm 16 having a guide pulley 17. The brake pins 18 are projected from the arm 16 and has brake shoe 19 at its end acting on the flange of the winding drum 6 to rotate it together with the hollow shaft 7. A sleeve 20 having spiral guide groove 21 is fixed to the end of the hollow shaft 7 by means of screw thread or formed integrally with the shaft. 23 represents another hollow shaft passing through the hollow shaft 7 and has a gear wheel 24 fixed to it to be driven by the gear wheels 25 and 26 from the side shaft 27 in the direction opposite to that of hollow shaft 7 at a suitable speed. 28 represents the third hollow shaft passing through the second hollow shaft 23 and is driven by the gear wheels 29 and 30 from the side shaft 27 in the same direction and at the same speed as that of the first hollow shaft 7. To the front end of the hollow shaft 28 is fixed a special guide piece 31 which is provided with a small hole 32 and a tapered guide surface 33 and also a guide nozzle 34 for the central conductor 1. 36 represents a guide pulley mounted on the bracket 37 which is fixed to the machine frame.

38 represents a rotating arm which is rotatably mounted on the bearing 39 by its hollow boss 40 and is arranged to be driven from the driving shaft 13 by a suitable means such, for instance, as the rope 41 and rope pulleys 42 and 43 at a desired speed. On the revolving arm 38 is mounted a bobbin 44 to rotate freely and deliver the thread or string 3 at a desired tension by means of a suitable brake device, not shown. 46 represents a thread guide rod projecting from the revolving arm 38 to guide the thread 3 through its small hole 47 at the tip end.

The operation of the present machine is as follows:—At first take the end of the wire 45 wound on the drum 6 over the guide pulley 17 and around the spiral guide groove 21 of the sleeve 20 against the tension of the wire 45 applied by the friction shoe 19 on the flange of the drum 6. The spirally turned wire is led around the guide sleeve 22 for several number of turns and then the end of the spiral wire is passed through the hole 32 of the guide piece 31 which is fixed to the top end of the third shaft 28.

If under such condition the right hand part of the machine, that is, the hollow spindles are driven by the gears on the side shaft from the driving shaft the second hollow spindle 23 driven by the gears 24, 25 and 26 will rotate in the direction opposite to those of the spindles 7 and 28 which are driven by the gearings 10, 11 and 29, 30 respectively at the same speed and in the same direction. Then the spiral wire 2 without being turned around its guide sleeve 22 will increase the number of turns owing to the rotation of the sleeve 22 in the direction opposite to the winding-up direction of the wire and since the guide piece 31 fixed to the third spindle 28 rotates in the same direction and at the same number of revolutions as that of the spiral guide sleeve 20 as well as the arm 16 one turn of the spiral wire will be delivered out in one revolution of the guide piece 31. When a suitable length of the spiral wire is formed the operation of the machine is stopped by shifting the belt on the driving pulley 15 to the idle pulley 14 and the forward end of the spiral wire is connected to the central conductor 1. Then the machine is started again to form the spiral wire surrounding the central conductor and pass through the left hand guide sleeve 40 and pulled out or wound up on a suitable winding drum, not shown. During such operation the insulator string or thread 3 is pulled out through the guide hole 47 of the rod 46 and the end of the thread 3 is connected to the central conductor 1 and then the arm 38 carrying the bobbin 44 is driven by the rope transmission consisting of 41, 42 and 43 at a suitable speed such, for instance, as four times the revolutions of the guide piece 31 in the same direction giving a suitable tension to the string 3. By turning the bobbin arm 38 in advance of the guide piece 31 the thread 3 connected to the central conductor and lying on one side of the tapered guide surface 33 will be brought to the other side of the spiral wire when it is delivered out and then the thread is passed around the central conductor again as seen from Figs. 3, 5, 6 and 7. In such a manner the thread 3 is wound around the central conductor and the spiral wire alternately and regularly in equi-angular radial directions in a definite pitch length of the spiral wire as shown in Fig. 2 so that the central conductor may be firmly supported by the tension of the insulator strings through the central axis of the spiral supporting wire.

The spiral member thus formed and having a central conductor on its center is automatically delivered through the guide sleeve 40 and is wound upon a suitable drum or directly led to a wrapping machine for applying paper or other suitable insulation layer or led to a wire winding machine for putting a series of external conductors 4 as desired to manufacture required concentric conductor.

Though I have shown and described in the foregoing an embodiment of my invention, yet various modifications may be derived without departing from the spirit of my invention. If the number of revolutions of the bobbin arm 38 is selected at five, six and seven times of those of the guide piece 31 the number of radial supporting strings can be increased to four, five and six in one pitch length of the spiral coil.

I claim:

1. A machine for automatically manufacturing concentric conductors, consisting of means for forming a spirally wound supporting member surrounding a central conductor located on the central axis of said spiral member and means for guiding said spiral member and central conductor and regularly delivering said two members and means for tieing an insulator string around the central conductor and the spiral supporting member alternately while both members are being delivered so that the central conductor may be held through the center of spiral supporting member by the combined tension of the tie string.

2. A machine for automatically manufacturing concentric conductors comprising a wire drum mounted on a hollow spindle having a spiral guide sleeve, an intermediate guide sleeve fitted in the spiral guide sleeve arranged to rotate in a direction opposite to the other, a central hollow spindle fitted in the intermediate guide sleeve and adapted to rotate in the same direction as that of the spiral sleeve, a guide piece projected from the end of the central hollow spindle, means for leading the central conductor through the center of the central hollow spindle, a rotatable arm supporting a thread bobbin and a guide arm for guiding the insulator thread wound on the bobbin at a suitable position over the tapered guide surface of the guide piece fixed to the central hollow spindle and means for turning the bobbin arm at a suitable speed relative to that of the central hollow spindle.

3. In an automatic spiral winding machine a central hollow spindle, a guide piece fixed to the central hollow spindle projecting from the end thereof, the guide piece having a small hole for passing and feeding the spirally wound wire and a tapering guide surface for guiding the thread toward the spiral wire as it is delivered out of the small hole and means for winding the insulator string around the central conductor and the spiral wire alternately by the revolving arm carrying the insulator string turning in advance of the speed of the guide piece, said revolving arm being supported on its hollow sleeve for receiving and passing the spiral wire therethrough on the same axis as that of the central spindle.

HITOSHI YASUOKA.